United States Patent
Shoaf (10) Patent No.: US 12,131,125 B2
(45) Date of Patent: Oct. 29, 2024

(54) AUTOMATED OUTCOME CLASSIFICATION SYSTEMS IN CONTACT INTERACTIONS, AND METHODS

(71) Applicant: INCONTACT INC., Sandy, UT (US)

(72) Inventor: Kyle J. Shoaf, Cottonwood Heights, UT (US)

(73) Assignee: INCONTACT LTD., Sandy, UT (US)

( * ) Notice: Subject to any disclaimer, the term of this patent is extended or adjusted under 35 U.S.C. 154(b) by 279 days.

(21) Appl. No.: 17/212,196

(22) Filed: Mar. 25, 2021

(65) Prior Publication Data

US 2022/0309251 A1    Sep. 29, 2022

(51) Int. Cl.
| | | |
|---|---|---|
| *G06F 40/35* | (2020.01) | |
| *G06F 40/205* | (2020.01) | |
| *G06F 40/295* | (2020.01) | |
| *G10L 17/00* | (2013.01) | |

(52) U.S. Cl.
CPC ............ *G06F 40/35* (2020.01); *G06F 40/205* (2020.01); *G06F 40/295* (2020.01); *G10L 17/00* (2013.01)

(58) Field of Classification Search
None
See application file for complete search history.

(56) References Cited

U.S. PATENT DOCUMENTS

| | | | | |
|---|---|---|---|---|
| 10,498,888 | B1 * | 12/2019 | Rute | G06N 20/00 |
| 10,990,760 | B1 * | 4/2021 | Monnett | G06F 40/295 |
| 2017/0353605 | A1 * | 12/2017 | Dumaine | G06F 18/00 |
| 2018/0232489 | A1 * | 8/2018 | Fink | G16H 50/70 |
| 2019/0391784 | A1 * | 12/2019 | Spiessbach | G10L 15/08 |
| 2020/0226503 | A1 * | 7/2020 | Subramanian | G06Q 10/04 |
| 2021/0027305 | A1 * | 1/2021 | Mackie | G06Q 30/016 |
| 2022/0172063 | A1 * | 6/2022 | Decrop | G06N 3/084 |

OTHER PUBLICATIONS

Shervin Minaee, et al.; *Deep Learning Based Text Classification: A Comprehensive Review*; Jan. 2020, 43 pages.
Shervin Minaee, et al.; *Deep Learning Based Text Classification: A Comprehensive Review*; vol. 1, No. 1, Jan. 2020, 43 pages.

* cited by examiner

*Primary Examiner* — Pierre Louis Desir
*Assistant Examiner* — Nicole A K Schmieder
(74) *Attorney, Agent, or Firm* — Haynes and Boone, LLP (57) ABSTRACT

A method of generating a disposition response includes receiving text of a connected contact interaction; determining, by a natural language processor, a sentiment, entities, and key phrases from the text; assigning, by a neural network, a disposition to the contact interaction based on the text, the sentiment, the entities, and the key phrases; generating a disposition response to the contact interaction based on the assigned disposition; and presenting the generated disposition response to a user.

13 Claims, 5 Drawing Sheets

AUTOMATED OUTCOME CLASSIFICATION SYSTEMS IN CONTACT INTERACTIONS, AND METHODS

TECHNICAL FIELD

The present disclosure relates generally to generating disposition responses for answered contact interactions, and more specifically to systems and methods for generating a disposition response based on an automatically determined disposition.

BACKGROUND

A contact disposition is a classification of an attempted (successfully connected or not) connection to a contact. A disposition is often used to record or classify the outcome of a successfully handled call or chat. Dispositions can trigger other actions, such as the scheduling of a callback, adding the contact to the do not call list, or finalizing the record. Without a disposition, systems would be unable to determine what the next action should be on a contact. For example, the system may need to classify a successfully connected contact as a callback so that the system knows further action is needed with that contact.

Currently, human input is relied on to enter dispositions for connected contact interactions. Relying on human input to record this data, however, consumes valuable agent availability time and leaves systems open to human error and omission. For example, an agent must take time during and after each interaction to select a disposition, write notes about the context of the interaction, and enter other pertinent data. This lost agent time and productivity can quickly aggregate, especially when dealing with enterprise level customers. Moreover, when agents manually enter dispositions, the system is exposed to human error and omission. Selecting an incorrect disposition or introducing a minor typo when entering a callback number could negatively affect customers and potentially lead to lost opportunities in the future.

Accordingly, a need exists for improved systems and methods for determining dispositions and generating disposition responses.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The systems and methods described herein automate the processes of determining a disposition for an answered contact interaction and accurately recording all pertinent information needed. The present systems and methods may be used on any contact interaction that requires a disposition including, but not limited to, outbound dialer calls, inbound calls, manual outbound calls, and chats.

In various embodiments, a speech to text service is used to transcribe the contents of a call interaction, and the transcript is passed to a natural language processor, which analyzes the transcript by breaking the words into tokens, reducing words into their stem, and determining key phrases. This analysis data and the transcript can then be passed to a trained neural network, which determines an appropriate disposition to assign. In certain embodiments, the steps described above occur while the contact interaction is occurring (e.g., in real-time), so that shortly after the contact interaction ends, a proper disposition is already assigned. A disposition response (e.g., Disposition: Callback; Date: Tomorrow; and Time: 1 pm) can then be generated based on the assigned disposition, and the disposition response may be presented to a user (e.g., a contact center agent).

Once a disposition response has been generated, the user can decide what actions he/she wants to take as a result. If the user has a high degree of faith in the system, the user can automatically take the generated response as the disposition response to follow. In other embodiments, at the end of a contact interaction, the three (or other pre-selected number) most likely disposition responses may be presented to the user for selection, and the user can select which disposition response to use. In another embodiment, the user may continue to rely entirely on the manual determination of the disposition response, and the disposition response determined by the system could be saved for later auditing.

Advantageously, the present methods and systems provide more consistent results than with manual determination of dispositions. Moreover, fewer human mistakes are made, and there is less chance of agents "gaming" the system. Agent productivity is increased because agents have more time to focus on interactions and are not burdened with determining the classification of an outcome in an interaction. Finally, the present methods can be used to check the manual classification of outcomes or be used as a backup.

Figure 1:
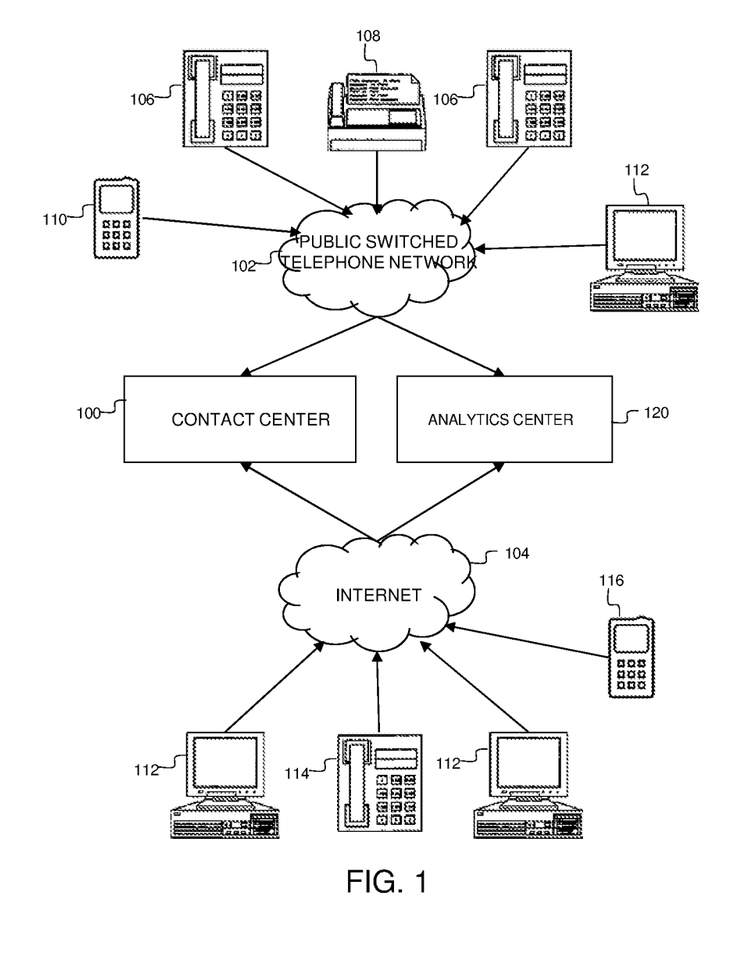
FIG. 1 is a simplified block diagram of an embodiment of a contact center according to various aspects of the present disclosure.

FIG. 1 is a simplified block diagram of an embodiment of a contact center 100 according to various aspects of the present disclosure. The term "contact center," as used herein, can include any facility or system server suitable for receiving and recording electronic communications from contacts. Such contact communications can include, for example, telephone calls, chats, facsimile transmissions, e-mails, web interactions, voice over IP ("VOIP") and video. Various specific types of communications contemplated through one or more of these channels include, without limitation, email, SMS data (e.g., text), tweet, instant message, web-form submission, smartphone app, social media data, and web content data (including but not limited to internet survey data, blog data, microblog data, discussion forum data, and chat data), etc. In some embodiments, the communications can include contact tasks, such as taking an order, making a sale, responding to a complaint, etc. In various aspects, real-time communication, such as voice, video, or both, is preferably included. It is contemplated that these communications may be transmitted by and through any type of telecommunication device and over any medium suitable for carrying data. For example, the communications may be transmitted by or through telephone lines, cable, or wireless communications. As shown in FIG. 1, the contact center 100 of the present disclosure is adapted to receive and record varying electronic communications and data formats that represent an interaction that may occur between a contact (or caller) and a contact center agent during fulfillment of a contact and agent transaction. In one embodiment, the contact center 100 records all of the contact calls in uncompressed audio formats. In the illustrated embodiment, contacts may communicate with agents associated with the contact center 100 via multiple different communication networks such as a public switched telephone network (PSTN) 102 or the Internet 104. For example, a contact may initiate an interaction session through traditional telephones 106, a fax machine 108, a cellular (i.e., mobile) telephone 110, a personal computing device 112 with a modem, or other legacy communication device via the PSTN 102. Further, the contact center 100 may accept internet-based interaction sessions from personal computing devices 112, VOIP telephones 114, and internet-enabled smartphones 116 and personal digital assistants (PDAs).

As one of ordinary skill in the art would recognize, the illustrated example of communication channels associated with a contact center 100 in FIG. 1 is just an example, and the contact center may accept contact interactions, and other analyzed interaction information and/or routing recommendations from an analytics center, through various additional and/or different devices and communication channels whether or not expressly described herein.

For example, in some embodiments, internet-based interactions and/or telephone-based interactions may be routed through an analytics center 120 before reaching the contact center 100 or may be routed simultaneously to the contact center and the analytics center (or even directly and only to the contact center). Also, in some embodiments, internet-based interactions may be received and handled by a marketing department associated with either the contact center 100 or analytics center 120. The analytics center 120 may be controlled by the same entity or a different entity than the contact center 100. Further, the analytics center 120 may be a part of, or independent of, the contact center 100.

Figure 2:
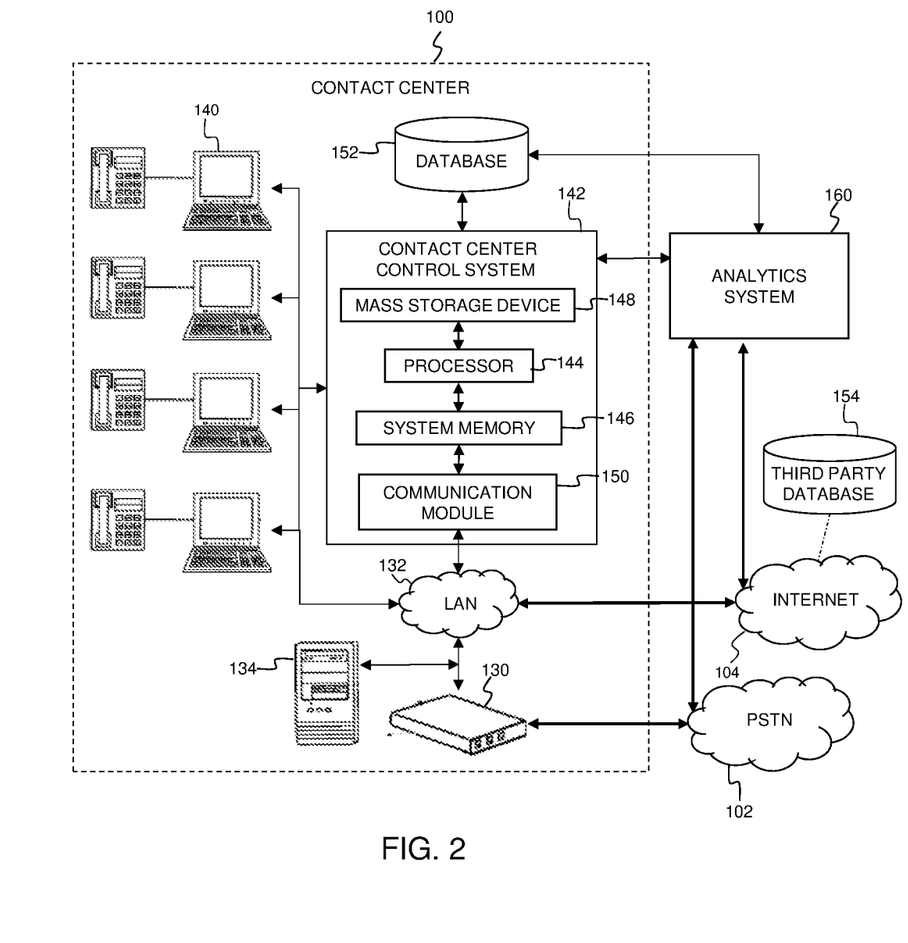
FIG. 2 is a more detailed block diagram of the contact center of FIG. 1 according to aspects of the present disclosure.

FIG. 2 is a more detailed block diagram of an embodiment of the contact center 100 according to aspects of the present disclosure. As shown in FIG. 2, the contact center 100 is communicatively coupled to the PSTN 102 via a distributed private branch exchange (PBX) switch 130 and/or ACD 130. The PBX switch 130 provides an interface between the PSTN 102 and a local area network (LAN) 132 within the contact center 100. In general, the PBX switch 130 connects trunk and line station interfaces of the PSTN 102 to components communicatively coupled to the LAN 132. The PBX switch 130 may be implemented with hardware or virtually. A hardware-based PBX may be implemented in equipment located local to the user of the PBX system. In contrast, a virtual PBX may be implemented in equipment located at a central telephone service provider that delivers PBX functionality as a service over the PSTN 102. Additionally, in one embodiment, the PBX switch 130 may be controlled by software stored on a telephony server 134 coupled to the PBX switch. In another embodiment, the PBX switch 130 may be integrated within telephony server 134. The telephony server 134 incorporates PBX control software to control the initiation and termination of connections between telephones within the contact center 100 and outside trunk connections to the PSTN 102. In addition, the software may monitor the status of all telephone stations coupled to the LAN 132 and may be capable of responding to telephony events to provide traditional telephone service. In certain embodiments, this may include the control and generation of the conventional signaling tones including without limitation dial tones, busy tones, ring back tones, as well as the connection and termination of media streams between telephones on the LAN 132. Further, the PBX control software may programmatically implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

Often, in contact center environments such as contact center 100, it is desirable to facilitate routing of contact communications, particularly based on agent availability, prediction of profile (e.g., personality type) of the contact occurring in association with a contact interaction, and/or matching of contact attributes to agent attributes, be it a telephone-based interaction, a web-based interaction, or other type of electronic interaction over the PSTN 102 or Internet 104. In various embodiments, ACD 130 is configured to route contact interactions to agents based availability, profile, and/or attributes.

ACD 130 distributes contact interactions or tasks to agents. Generally, ACD 130 is part of a switching system designed to receive contact interactions and queue them. In addition, ACD 130 as shown distributes interactions to agents or specific groups of agents typically according to a prearranged scheme. In one embodiment, ACD 130 is integrated with PBX switch 130, and directs contact interactions to one of a plurality of agent workstations 140.

According to an exemplary embodiment, ACD 130 includes a processor, a network interface, and a memory module or database. The network interface joins ACD 130 with LAN 132. Once ACD 130 receives a contact interaction, the processor determines which of a plurality of agents should receive the interaction. For example, the processor may access the memory module, which stores code executed by the processor to perform various tasks.

In various embodiments, the processor includes a plurality of engines or modules. Examples of suitable engines include a distributor engine, a queue engine, and a monitor engine. The distributor engine distributes incoming contact interactions to available agents, the queue engine monitors and maintains contact interactions that are waiting to be connected to agents, and the monitor engine checks the status and skills of agents and stores appropriate information in the memory module.

The memory module stores various information about agents at the contact center, including, but not limited to, agent skills or attributes, agent location, and agent availability. Various alternative embodiments of ACD 130 may store different or additional information useful for interaction routing as well. Over time, monitor engine updates agent skills information, location information, and availability based on changes in agent status detected.

Generally, ACD 130 receives incoming interactions that may be handled by one of the agents at the contact center 100. The distributor engine connects the interaction to an appropriate available agent if the agent is available. If the agent is not available, the interaction is generally held by the queue engine until the agent becomes available. While a contact is waiting for an agent, ACD 130 may collect data from the contact or perform other automated processes. Once the agent is available, the distributor engine routes the interaction to the agent.

In one embodiment, the telephony server 134 includes a trunk interface that utilizes conventional telephony trunk transmission supervision and signaling protocols required to interface with the outside trunk circuits from the PSTN 102. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The telephony server 134 includes hardware and software components to interface with the LAN 132 of the contact center 100. In one embodiment, the LAN 132 may utilize IP telephony, which integrates audio and video stream control with legacy telephony functions and may be supported through the H.323 protocol. H.323 is an International Telecommunication Union (ITU) telecommunications protocol that defines a standard for providing voice and video services over data networks. H.323 permits users to make point-to-point audio and video phone calls over a local area network. IP telephony systems can be integrated with the public telephone system through an IP/PBX-PSTN gateway, thereby allowing a user to place telephone calls from an enabled computer. For example, a call from an IP telephony client within the contact center 100 to a conventional telephone outside of the contact center would be routed via the LAN132 to the IP/PBX-PSTN gateway. The IP/PBX-PSTN gateway would then translate the H.323 protocol to conventional telephone protocol and route the call over the PSTN 102 to its destination. Conversely, an incoming call from a contact over the PSTN 102 may be routed to the IP/PBX-PSTN gateway, which translates the conventional telephone protocol to H.323 protocol so that it may be routed to a VoIP-enable phone or computer within the contact center 100.

The contact center 100 is further communicatively coupled to the Internet 104 via hardware and software components within the LAN 132. One of ordinary skill in the art would recognize that the LAN 132 and the connections between the contact center 100 and external networks such as the PSTN 102 and the Internet 104 as illustrated by FIG. 2 have been simplified for the sake of clarity and the contact center may include various additional and/or different software and hardware networking components such as routers, switches, gateways, network bridges, hubs, and legacy telephony equipment.

As shown in FIG. 2, the contact center 100 includes a plurality of agent workstations 140 that enable agents employed by the contact center 100 to engage in contact interactions over a plurality of communication channels. In one embodiment, each agent workstation 140 may include at least a telephone and a computer workstation. In other embodiments, each agent workstation 140 may include a computer workstation that provides both computing and telephony functionality. Through the workstations 140, the agents may engage in telephone conversations with the contact, respond to email inquiries, receive faxes, engage in instant message conversations, text (e.g., SMS, MMS), respond to website-based inquires, video chat with a contact, and otherwise participate in various contact interaction sessions across one or more channels including social media postings (e.g., Facebook, LinkedIn, etc.). Further, in some embodiments, the agent workstations 140 may be remotely located from the contact center 100, for example, in another city, state, or country. Alternatively, in some embodiments, an agent may be a software-based application configured to interact in some manner with a contact. An exemplary software-based application as an agent is an online chat program designed to interpret contact inquiries and respond with pre-programmed answers.

The contact center 100 further includes a contact center control system 142 that is generally configured to provide recording, voice analysis, behavioral analysis, text analysis, storage, and other processing functionality to the contact center 100. In the illustrated embodiment, the contact center control system 142 is an information handling system such as a computer, server, workstation, mainframe computer, or other suitable computing device. In other embodiments, the control system 142 may be a plurality of communicatively coupled computing devices coordinated to provide the above functionality for the contact center 100. The control system 142 includes a processor 144 that is communicatively coupled to a system memory 146, a mass storage device 148, and a communication module 150. The processor 144 can be any custom made or commercially available processor, a central processing unit (CPU), an auxiliary processor among several processors associated with the control system 142, a semiconductor-based microprocessor (in the form of a microchip or chip set), a microprocessor, a collection of communicatively coupled processors, or any device for executing software instructions. The system memory 146 provides the processor 144 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data, such as known voice prints, may be stored on the mass storage device 148. Examples of mass storage devices may include hard discs, optical disks, magneto-optical discs, solid-state storage devices, tape drives, CD-ROM drives, and/or a variety other mass storage devices known in the art. Further, the mass storage device may be implemented across one or more network-based storage systems, such as a storage area network (SAN). The communication module 150 is operable to receive and transmit contact center-related data between local and remote networked systems and communicate information such as contact interaction recordings between the other components coupled to the LAN 132. Examples of communication modules may include Ethernet cards, 802.11 WiFi devices, cellular data radios, and/or other suitable devices known in the art. The contact center control system 142 may further include any number of additional components, which are omitted for simplicity, such as input and/or output (I/O) devices (or peripherals), buses, dedicated graphics controllers, storage controllers, buffers (caches), and drivers. Further, functionality described in association with the control system 142 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software.

According to one aspect of the present disclosure, the contact center control system 142 is configured to record, collect, and analyze contact voice data and other structured and unstructured data, and other tools may be used in association therewith to increase efficiency and efficacy of the contact center. As an aspect of this, the control system 142 is operable to record unstructured interactions between contacts and agents occurring over different communication channels including without limitation telephone conversations, email exchanges, website postings, social media communications, smartphone application (i.e., app) communications, fax messages, texts (e.g., SMS, MMS, etc.), and instant message conversations.

The control system 142 may include a hardware or software-based recording server to capture the audio of a standard or VoIP telephone connection established between an agent workstation 140 and an outside contact telephone system. Further, the audio from an unstructured telephone call or video conference session (or any other communication channel involving audio or video, e.g., a Skype call) may be transcribed manually or automatically and stored in association with the original audio or video. In one embodiment, multiple communication channels (i.e., multi-channel) may be used, either in real-time to collect information, for evaluation, or both. For example, control system 142 can receive, evaluate, and store telephone calls, emails, and fax messages. Thus, multi-channel can refer to multiple channels of interaction data, or analysis using two or more channels, depending on the context herein.

In addition to unstructured interaction data such as interaction transcriptions, the control system 142 is configured to captured structured data related to contacts, agents, and their interactions. For example, in one embodiment, a "cradle-to-grave" recording may be used to record all information related to a particular telephone call from the time the call enters the contact center to the later of: the caller hanging up or the agent completing the transaction. All or a portion of the interactions during the call may be recorded, including interaction with an interactive voice response (IVR) system, time spent on hold, data keyed through the caller's key pad, conversations with the agent, and screens displayed by the agent at his/her station during the transaction. Additionally, structured data associated with interactions with specific contacts may be collected and associated with each contact, including without limitation the number and length of calls placed to the contact center, call origination information, reasons for interactions, outcome of interactions, average hold time, agent actions during interactions with the contact, manager escalations during calls, types of social media interactions, number of distress events during interactions, survey results, and other interaction information. In addition to collecting interaction data associated with a contact, the control system 142 is also operable to collect biographical profile information specific to a contact including without limitation contact phone number, account/policy numbers, address, employment status, income, gender, race, age, education, nationality, ethnicity, marital status, credit score, contact "value" data (i.e., contact tenure, money spent as contact, etc.), personality type (as determined based on past interactions), and other relevant contact identification and biological information. The control system 142 may also collect agent-specific unstructured and structured data including without limitation agent personality type, gender, language skills, technical skills, performance data (e.g., contact retention rate, etc.), tenure and salary data, training level, average hold time during interactions, manager escalations, agent workstation utilization, and any other agent data relevant to contact center performance. Additionally, one of ordinary skill in the art would recognize that the types of data collected by the contact center control system 142 that are identified above are simply examples and additional and/or different interaction data, contact data, agent data, and telephony data may be collected and processed by the control system 142.

The control system 142 may store recorded and collected interaction data in a database 152, including contact data and agent data. In certain embodiments, agent data, such as agent scores for dealing with contacts, are updated daily or at the end of an agent shift.

The control system 142 may store recorded and collected interaction data in a database 152. The database 152 may be any type of reliable storage solution such as a RAID-based storage server, an array of hard disks, a storage area network of interconnected storage devices, an array of tape drives, or some other scalable storage solution located either within the contact center or remotely located (i.e., in the cloud). Further, in other embodiments, the contact center control system 142 may have access not only to data collected within the contact center 100 but also data made available by external sources such as a third party database 154. In certain embodiments, the control system 142 may query the third party database for contact data such as credit reports, past transaction data, and other structured and unstructured data.

Additionally, in some embodiments, an analytics system 160 may also perform some or all of the functionality ascribed to the contact center control system 142 above. For instance, the analytics system 160 may record telephone and internet-based interactions, and/or perform behavioral analyses. The analytics system 160 may be integrated into the contact center control system 142 as a hardware or software module and share its computing resources 144, 146, 148, and 150, or it may be a separate computing system housed, for example, in the analytics center 120 shown in FIG. 1. In the latter case, the analytics system 160 includes its own processor and non-transitory computer-readable storage medium (e.g., system memory, hard drive, etc.) on which to store analytics software and other software instructions.

Figure 3:
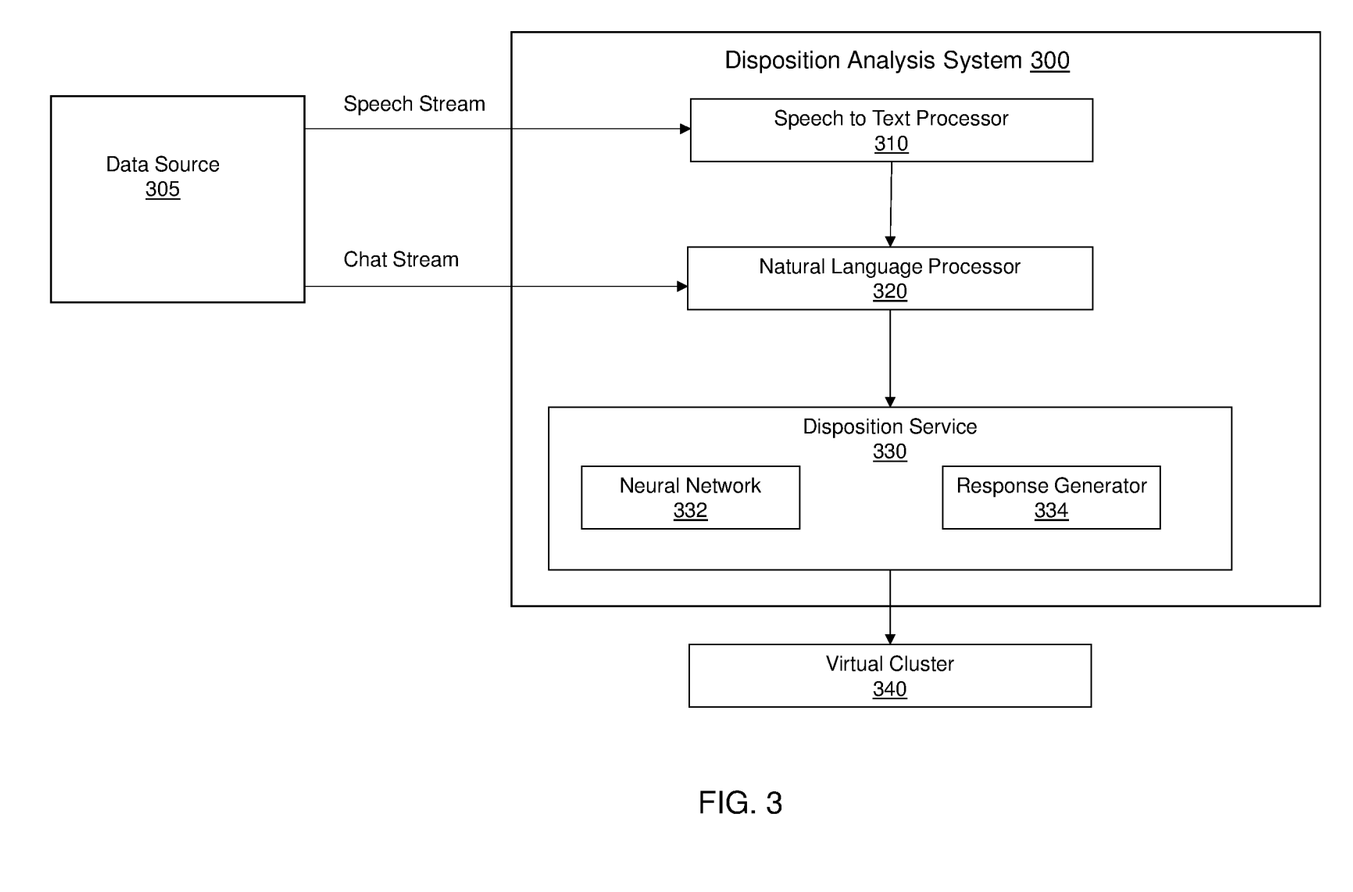
FIG. 3 is an exemplary computing environment suitable for implementing the present methods and systems, according to aspects of the present disclosure.

Referring now to FIG. 3, shown is an exemplary computing environment where the present methods and systems may be implemented. The environment includes data source 305, disposition analysis system 300, and virtual cluster 340. In this embodiment, disposition analysis system 300 includes speech to text processor 310, natural language processor 320, and disposition service 330.

According to various embodiments, data source 305 passes a speech or voice stream to speech to text processor 310, or passes a chat stream to natural language processor 320. In some embodiments, data source 305 includes ACD 130. Speech to text processor 310 converts an audio stream into text that is easier to work with. The resulting transcript is then passed to natural language processor 320 in this embodiment. Natural language processor 320 automatically processes and analyzes the human language. Typically, natural language processor 320 breaks the transcript down into tokens, reduces words into their stems for easier analysis, and determines key phrases, entities, and sentiment. Thus, natural language processor 320 breaks the transcript down into a simpler to understand computational form. In certain embodiments, the lexeme (the base or root of a word or series of words) of the transcript is then passed to disposition service 330.

As shown, disposition service 330 includes neural network 332 and response generator 334. Neural network 332 includes a set of algorithms designed to recognize and map relationships in data sets in a way that mimics how the human brain works. In various embodiments, neural network 332 is created utilizing deep learning techniques and trained via data sets that include text of a contact interaction and a disposition assigned by the agent that handled the interaction. These two data points combined can be used as a training set to create a computer-generated algorithm capable of determining a proper disposition from a text transcript. The larger the data set, the greater the accuracy of the neural network. By utilizing a neural network, creation of a classification algorithm is avoided. Instead, a computational algorithm is self-taught based on the data sets that are provided to it.

Once trained, neural network 332 takes the standardized output (e.g., lexeme) from natural language processor 320 and successfully assigns a predefined disposition to a contact interaction. The assigned disposition, along with the data returned from natural language processor 332, is passed to response generator 334, an algorithm that generates the disposition response. If the disposition is of the type that requires additional data fields, response generator 334 can parse through natural language processor's 320 entity and key phrase results for the desired data to return the disposition response. For example, if neural network 332 determines the disposition type to be "Retry—Rescheduled Specified Date/Time-Any Agent," then response generator 334 would need to search the set of key phrases and entities for any date/time objects to set as the callback date. If no additional data is required for this disposition type, the disposition response is simply generated without having to search for additional data. This disposition response, along with the call/chat transcript can then be passed back to virtual cluster 340 for recording. In an exemplary embodiment, virtual cluster 340 includes control system 142.

Figure 4:
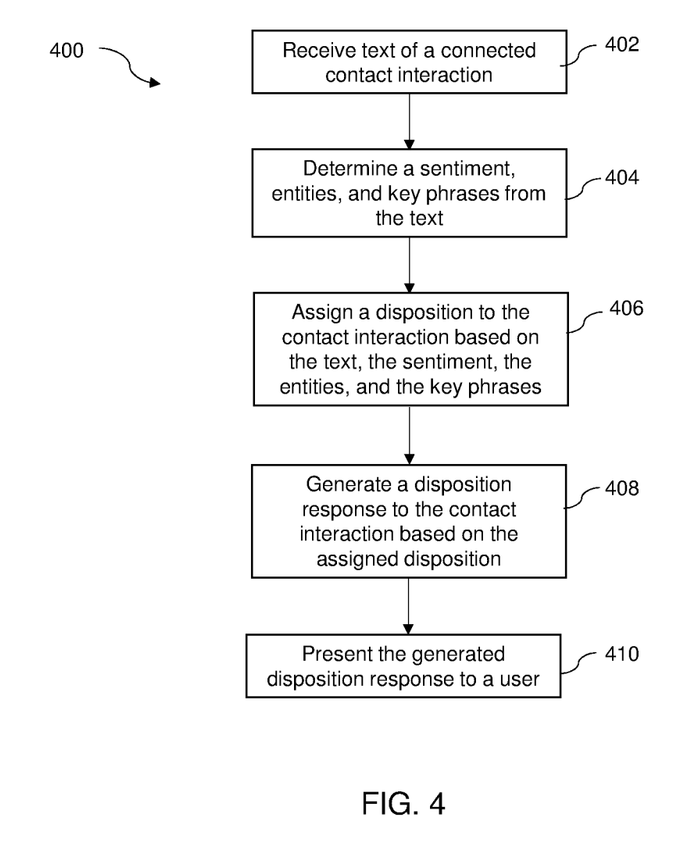
FIG. 4 is a flowchart of a method according to embodiments of the present disclosure.

Referring now to FIG. 4, a method 400 according to embodiments of the present disclosure is described. At step 402, disposition analysis system 300 receives text of a connected contact interaction. In various embodiments, the text is received from data source 305 (e.g., ACD 130). A connected contact interaction is an interaction where the contact is successfully reached or communicated with. For example, a connected contact interaction could be an interaction where an agent is able to speak to the contact.

In various embodiments, the contact interaction includes a call interaction, and disposition analysis system 300, via speech to text processor 310, converts the call interaction to text. In other embodiments, the contact interaction includes a chat interaction, which does not need to be converted to text. In certain embodiments, the text or transcript of the contact interaction is passed to natural language processor 320.

At step 404, disposition analysis system 300, via natural language processor 320, determines a sentiment, entities, and key phrases from the text or transcript of the contact interaction. Sentiment analysis includes the task of determining whether the text has an overlying positive, negative, neutral, or mixed sentiment. The sentiment is derived from the context of the transcript as a whole. Positive, negative, neutral, or mixed marks are all scored as a percentage of the overall sentiment, and the predominant percentage is assigned as the overall sentiment.

The entities field returns a list of each real world object from the text. In some embodiments, the entities include people, places, objects, dates, times, quantities, or a combination thereof. Each entity can be returned with its place in the transcript, the entity type, and a score indicating how sure the system 300 is that the entity was labeled correctly. As explained above, these entities can be used down the line to fill out specific disposition criteria. For example, if neural network 332 determines that the disposition should be a callback at another date/time, response generator 334 would be trained to know to look for date entities to input as the new callback time.

The key phrases response shows a collection of all the key phrases or main talking points from the text with an accuracy score. As explained above, these key phrases can be used again in helping determine specific disposition criteria. In the example of a callback at another date/time disposition, if natural language processor 320 picks up that the key phrase tomorrow at 1 pm is used multiple times throughout the transcript, there is a stronger degree of accuracy of what the callback time should be.

At step 406, disposition analysis system 300, via neural network 332, assigns a disposition to the contact interaction based on the text, the sentiment, the entities, and the key phrases. In some embodiments, the lexeme of the original text or transcript is passed to neural network 332. The assigned disposition can include "Positive w/Amount," "Positive no Amount," "Negative-DNC-Skill," "Negative-DNC-BU." "Negative." "Other," "Retry—Rescheduled Agent Specific." "Retry—Rescheduled Specified Date/Time-any agent." "Retry—Rescheduled later date/time unspecified," "Retry—Not Available," "Retry—Answering Machine," "Final-Answering Machine," or "Fax Machine."

In some embodiments, disposition analysis system 300 trains neural network 332 to assign a disposition to the contact interaction. When training, a collection of software "neurons" may be created and connected together, allowing them to send messages to each other. Next, the neural network 332 is asked to solve a problem based on an initial set of training data. The neural network 332 with a preset of inputs and expected outputs will attempt different paths over and over, each time strengthening the connections that lead to success and diminishing those that lead to failure.

Below is an example set of training data. The training data includes a transcript with what the correct disposition should be. When training, neural network 332 builds associations with words from each transcript and assigns the words weights. These weights can then be utilized to determine the probability of what disposition a transcript most adheres to.

({"class":"DNC", "transcript":"Never call me again!"})

({"class":"DNC", "transcript":"Please remove me from your lists"})
({"class":"DNC", "transcript":"I would no longer like to receive these calls"})
({"class":"DNC", "transcript":"call me again and I sue"})
({"class":"Callback","transcript":"Could you call me back in an hour"})
({"class":"Callback", "transcript":"I'm busy, try again later"})
({"class":"Callback", "transcript":"No I'm not available but will be tomorrow"})
({"class":"Callback", "transcript":"Can't talk now, call later"})
({"class":"PositiveW/Amount", "transcript":"Sure, I can pay the full amount today"})
({"class":"PositiveW/Amount", "transcript":"I can only pay half the payment, is that ok"})
({"class":"PositiveW/Amount", "transcript":"Sure, you may charge my account"})
({"class":"PositiveW/Amount", "transcript":"I can pay in full with my amex"})

Once the text has been assigned a disposition with probability of accuracy, disposition analysis system 300 can make judgments on how to record the disposition.

TABLE 1

PROBABILITY OF ACCURACY IN DISPOSITIONS

| Validation Set Input | Output |
| --- | --- |
| "Don't call here again." | [[DNC', 0.99917]] |
| "Call me back at 9998887777." | [[Callback', 0.99964]] |
| "Talk to you tomorrow." | [[Callback', 0.95647]] |
| "I'll pay half the amount today." | [[Callback', 0.95647]] |

At step 408, disposition analysis system 300, via response generator 334, generates a disposition response to the contact interaction based on the assigned disposition. In some embodiments, disposition analysis system 300 determines whether the disposition response requires additional disposition information. In various embodiments, disposition analysis system 300 obtains the additional disposition information from the entities, the key phrases, or both that were determined by natural language processor 320. In other embodiments, disposition analysis system 300 determines that the additional disposition information is missing and adds a flag to the disposition to the response to signify missing data.

At step 410, disposition analysis system 300 presents the generated disposition response to a user, such as a contact center agent. In several embodiments, disposition analysis system 300 records the generated disposition response.

A specific example of the method 400 will now be described in detail. First, an original text or transcript is obtained.

Original Transcript: Hi. This is Alex from InContact. Auto sales. Do you have a moment to talk about your car? No, I do not. Uh, sir, What? Can I give you a call back at another time, then? Sure. Tomorrow around one PM would work. Alright. Is there a Number that you want me to call you back at? Yeah, it would be 541 800 64 83. Okay. I will give you a call back tomorrow at one o'clock.

The transcript is passed to natural language processor 320 to determine sentiment, entities, and key phrases as follows.

\","\"Sentiment\":{\"Sentiment\":\"NEUTRAL\",\"SentimentScore\":{\"Positive\":0.234 0017408132553,\"Negative\":0.01943579688668251,\"Neutral\": 0.746555507183075,\"Mixed\": 0.00000701421868143370­4}},
\"Entities\":{\"Entities\":[{\"Score\": 0.9982478618621826,\"Type\":\"PERSON\",\"Text\": \"Alex\",\"BeginOffset\":12,\"EndOffset\":16},{\"Score\": 0.9590461850166321,\"Type\":\"DATE\",\"Text\": \"Tomorrow around one PM\",\"BeginOffset\":176, \"EndOffset\":198},{\"Score\":0.9982486367225647, \"Type\":\"OTHER \",\"Text\":\"541 800 64 83\", \"BeginOffset\":299,\"EndOffset\":312},{\"Score\": 0.9401795268058777,\"Type\":\"DATE\",\"Text\": \"tomorrow at\",\"BeginOffset\":348,\"EndOffset\":359}, {\"Score\":0.7477023601531982,\"Type\":\"DATE\", \"Text\":\"one o'clock\",\"BeginOffset\":360,\"EndOffset\": 371}]},
\"KeyPhrases\":{\"KeyPhrases\":[{\"Score\": 0.8719721436500549,\"Text\":\"Alex\",\"BeginOffset\":12, \"EndOffset\":16},{\"Score\":0.9999042749404907, \"Text\":\"contact\",\"BeginOffset \":25,\"EndOffset\":32}, {\"Score\":0.9998990297317505,\"Text\":\"Auto sales\", \"BeginOffset\":34,\"EndOffset\":44},{\"Score\": 0.9999991059303284,\"Text\":\"a moment\", \"BeginOffset\":58,\"EndOffset\":66},{\"Score\": 0.9999997615814209,\"Text\":\"your car\", \"BeginOffset\":81,\"EndOffset\":89},{\"Score\": 0.988465428352356,\"Text\":\"Uh\",\"BeginOffset \":105, \"EndOffset\":107},{\"Score\":0.9999696016311646, \"Text\":\"a call\",\"BeginOffset\":135,\"EndOffset\":141}, {\"Score\":0.9999645352363586,\"Text\":\"another time\", \"BeginOffset\":150,\"EndOffset\":162},{\"Score\": 0.9999779462814331,\"Text\":\"Tomorrow \",\"BeginOffset\":176,\"EndOffset\":184},{\"Score\": 0.9475786685943604,\"Text\":\"one PM\",\"BeginOffset\": 192,\"EndOffset\":198},{\"Score\":0.9886416792869568, \"Text\":\"Eyes\", \"BeginOffset\":220,\"EndOffset\":224}, {\"Score\":0.9774922728538513,\"Text\":\"541 800 64 83\",\"BeginOffset\":303,\"EndOffset\":312},{\"Score\": 0.9846362471580505,\"Text\":\"a call\",\"BeginOffset\": 336,\"EndOffset\":342},{\"Score\":0.972118616104126, \"Text\":\"tomorrow \",\"BeginOffset\":348,\"EndOffset\": 356},{\"Score\":0.9905910491943359,\"Text\":\"one o'clock\",\"BeginOffset\":360,\"EndOffset\":371}, {\"Score\":0.9999206066131592,\"Text\":\"that number\", \"BeginOffset\":376,\"EndOffset\":387}]}}"

The lexeme of the transcript is obtained and gives the base or the root of each word or sentence in a transcript. By breaking down the transcript into a more standardized form, neural network 332 can obtain more consistent results.

\"Lexeme\": {Hi. This be Alex from in contact. Auto sale. Do you have a moment to talk about your car? No, I do not. uh, sir, What? Can I give you a call back at another time, then? Sure. Tomorrow around one PM will work. Alright. be there a Number that you want me to call you back at? Yeah, it will be 541 800 64 83. Okay. I will give you a call back tomorrow at one o'clock.}"

The above can be further broken down to show that from the original transcript:
Sentiment: Neutral
Entities:
Type: Person, Text: Alex
Type: Date, Text: Tomorrow around one
Type: Other, Text: 541 800 64 83
Type: Date, Text: tomorrow
Type: Date, Text: one o'clock
Key Phrases:
1. Alex
2. Contact 3. Auto sales
4. a call
5. another time
6. Tomorrow
7. one PM
8. 800 6483
9. a call
10. tomorrow
11. one o'clock
12. that number The data set below can then be passed to trained neural network 332:

{1,Transcript="Hi. This be Alex from in contact. Auto sale. Do you have a moment to talk about your car? No, I do not. uh, sir, What? Can I give you a call back at another time, then? Sure. Tomorrow around one PM will work. Alright. be there a Number that you want me to call you back at? Yeah, it will be 541 800 64 83. Okay. I will give you a call back tomorrow at one o'clock"}

The input to neural network 332 is passed as a tuple where the first element is a unique identifier and the second element is the lexeme version of the transcript.

Based on the input, the following disposition is outputted by neural network 332: {1, Disposition: Retry—Rescheduled Specified Date/Time-any agent}. In this example, neural network 332 determined the disposition type to be that of a callback for a specific date or time. The disposition, along with the results from natural language processor 320, is then used to form the disposition response, which is sent back to virtual cluster 340 for recording.

In this example, response generator 334 looked up the needed fields to complete the disposition response. Response generator 334 looked at the date/time entities and key phrases to determine the specific date and time that the callback should occur. The disposition response here is: {1, Disposition: Callback, Date: Tomorrow, Time: 1:00 am}

Figure 5:
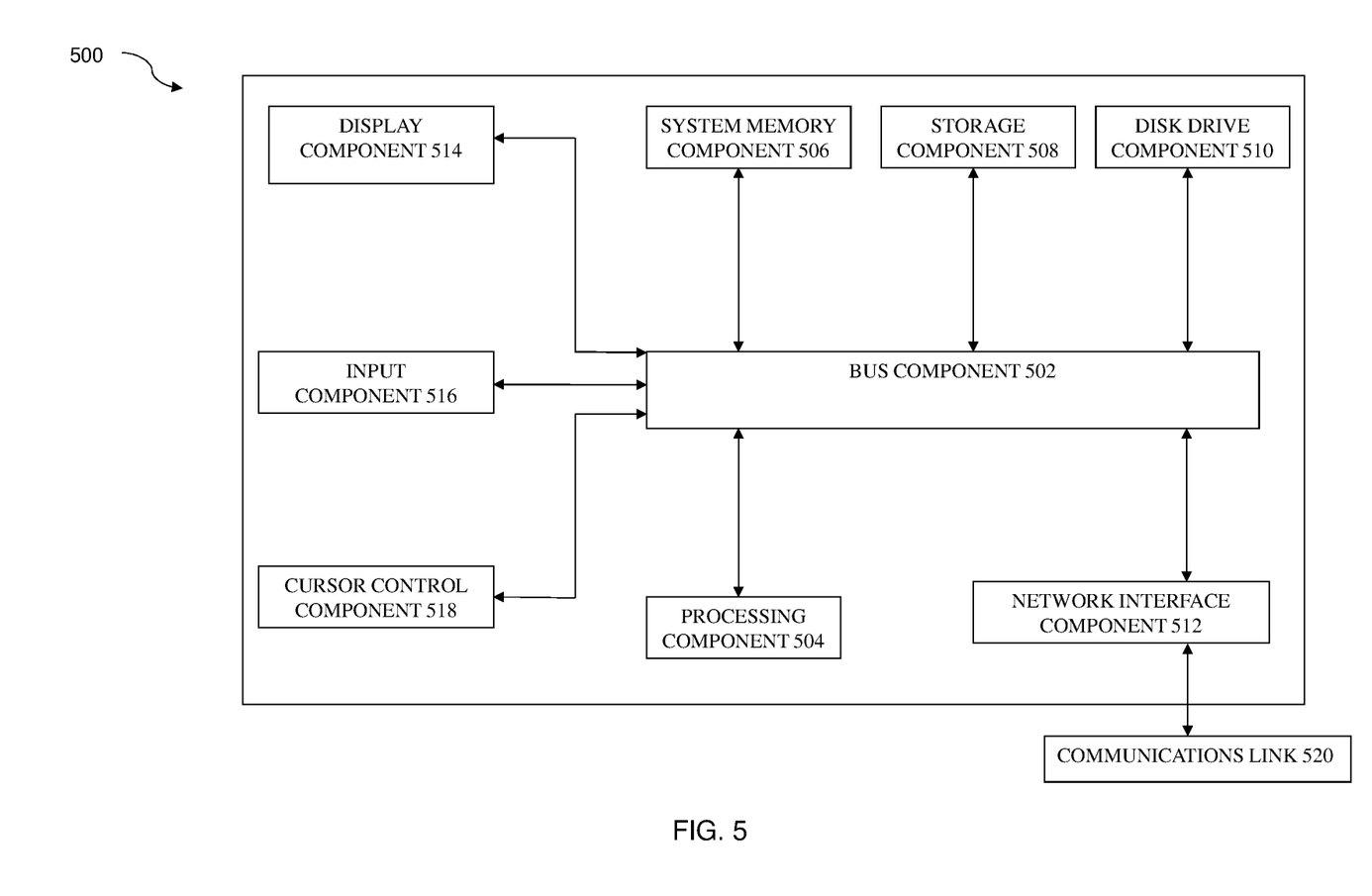
FIG. 5 is a block diagram of a computer system suitable for implementing one or more components in FIG. 1, 2, or 3 according to one embodiment of the present disclosure.

Referring now to FIG. 5, illustrated is a block diagram of a system 500 suitable for implementing embodiments of the present disclosure, including disposition analysis system 300. System 500, such as part a computer and/or a network server, includes a bus 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., keypad or keyboard), and a cursor control component 518 (e.g., a mouse pad).

In accordance with embodiments of the present disclosure, system 500 performs specific operations by processor 504 executing one or more sequences of one or more instructions contained in system memory component 506. Such instructions may be read into system memory component 506 from another computer readable medium, such as static storage component 508. These may include instructions receive text of a connected contact interaction; determine, by a natural language processor, a sentiment, entities, and key phrases from the text; assign, by a neural network, a disposition to the contact interaction based on the text, the sentiment, the entities, and the key phrases; generate a disposition response to the contact interaction based on the assigned disposition; and present the generated disposition response to a user. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., networks 102 or 104 of FIG. 2. LAN 132, WLAN, PTSN, or various other wired or wireless networks) may perform instruction sequences to practice the disclosure in coordination with one another. Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution. The Abstract at the end of this disclosure is provided to comply with 37 C.F.R. § 1.72 (b) to allow a quick determination of the nature of the technical disclosure. It is submitted with the understanding that it will not be used to interpret or limit the scope or meaning of the claims.

What is claimed is:

1. A disposition analysis system comprising:
a processor and a computer readable medium operably coupled thereto, the computer readable medium comprising a plurality of instructions stored in association therewith that are accessible to, and executable by, the processor, to perform operations which comprise:
receiving text of a connected contact interaction;
determining, by a natural language processor, a lexeme, a sentiment, entities, and key phrases from the text;
training a neural network to assign a contact disposition to the connected contact interaction by providing training data comprising transcripts classified as having a callback disposition, a do-not-call disposition, and a positive with payment amount to be paid by a customer disposition;
assigning, by the trained neural network, the contact disposition to the connected contact interaction based on the text, the lexeme, the sentiment, the entities, and the key phrases;
generating a disposition response to the connected contact interaction based on the assigned contact disposition, wherein:
the disposition response comprises scheduling a callback to the customer for a specific date and time, and obtaining the specific date and time from the entities and the key phrases from the text of the connected contact interaction; and presenting the generated disposition response to a user, wherein the lexeme comprises a base or root of a word or series of words.

2. The disposition analysis system of claim 1, wherein the entities comprise people, places, objects, dates, times, quantities, or a combination thereof.

3. The disposition analysis system of claim 1, wherein the connected contact interaction comprises a call interaction, and the operations further comprise converting the call interaction to the text.

4. The disposition analysis system of claim 1, wherein the operations further comprise recording the generated disposition response.

5. The disposition analysis system of claim 1, wherein the assigned contact disposition indicates that a specific agent should call the customer back, or that any agent can call the customer back.

6. A method of generating a disposition response, which comprises:

receiving text of a connected contact interaction;

determining, by a natural language processor, a lexeme, a sentiment, entities, and key phrases from the text;

training a neural network to assign a contact disposition to the connected contact interaction by providing training data comprising transcripts classified as having a callback disposition, a do-not-call disposition, and a positive with payment amount to be paid by a customer disposition;

assigning, by the trained neural network, the contact disposition to the connected contact interaction based on the text, the lexeme, the sentiment, the entities, and the key phrases;

generating a disposition response to the connected contact interaction based on the assigned contact disposition, wherein:

the disposition response comprises scheduling a callback to the customer for a specific date and time, and obtaining the specific date and time from the entities and the key phrases from the text of the connected contact interaction; and presenting the generated disposition response to a user, wherein the lexeme comprises a base or root of a word or series of words.

7. The method of claim 6, wherein the connected contact interaction comprises a call interaction, and the method further comprises converting the call interaction to the text.

8. The method of claim 6, further comprising recording the generated disposition response.

9. The method of claim 6, wherein the assigned contact disposition indicates that a specific agent should call the customer back, or that any agent can call the customer back.

10. A non-transitory computer-readable medium having stored thereon computer-readable instructions executable by a processor to perform operations which comprise:

receiving text of a connected contact interaction;

determining, by a natural language processor, a lexeme, a sentiment, entities, and key phrases from the text;

training a neural network to assign a contact disposition to the connected contact interaction by providing training data comprising transcripts classified as having a callback disposition, a do-not-call disposition, and a positive with payment amount to be paid by a customer disposition;

assigning, by the trained neural network, the contact disposition to the connected contact interaction based on the text, the lexeme, the sentiment, the entities, and the key phrases;

generating a disposition response to the connected contact interaction based on the assigned contact disposition, wherein:

the disposition response comprises scheduling a callback to the customer for a specific date and time, and obtaining the specific date and time from the entities and the key phrases from the text of the connected contact interaction; and presenting the generated disposition response to a user, wherein the lexeme comprises a base or root of a word or series of words.

11. The non-transitory computer-readable medium of claim 10, wherein the connected contact interaction comprises a call interaction, and the operations further comprise converting the call interaction to the text.

12. The non-transitory computer-readable medium of claim 10, wherein the operations further comprise recording the generated disposition response.

13. The non-transitory computer-readable medium of claim 10, wherein the assigned contact disposition indicates that a specific agent should call the customer back, or that any agent can call the customer back.

* * * * *